United States Patent [19]

Brocklehurst

[11] Patent Number: 5,174,721
[45] Date of Patent: Dec. 29, 1992

[54] HELICOPTER ROTOR BLADES
[75] Inventor: Alan Brocklehurst, Sherborne, England
[73] Assignee: Westland Helicopters Limited, England
[21] Appl. No.: 774,359
[22] Filed: Oct. 10, 1991
[30] Foreign Application Priority Data
Oct. 13, 1990 [GB] United Kingdom ............... 9022281
[51] Int. Cl.⁵ ............................................. B64C 11/18
[52] U.S. Cl. .......................... 416/223 R; 416/DIG. 5
[58] Field of Search ............ 416/223 R, 228, DIG. 2, 416/DIG. 5

[56] References Cited
U.S. PATENT DOCUMENTS

| | | | |
|---|---|---|---|
| 3,053,325 | 9/1962 | Ferreira | 416/228 |
| 3,721,507 | 3/1973 | Monteleone | 416/223 |
| 3,972,646 | 8/1976 | Brown et al. | 416/223 |
| 4,012,172 | 3/1977 | Schwaar et al. | 416/228 |
| 4,063,852 | 12/1977 | O'Connor | 416/223 |
| 4,142,837 | 3/1979 | de Simone | 416/223 |
| 4,880,355 | 11/1989 | Vuillet et al. | 416/228 |
| 5,035,577 | 7/1991 | Damongeot | 416/223 |
| 5,064,345 | 11/1991 | Kimball | 416/DIG. 5 |

FOREIGN PATENT DOCUMENTS

| | | | |
|---|---|---|---|
| 115911 | 10/1978 | Japan | 416/223 R |
| 199997 | 9/1987 | Japan | 416/228 |
| 119463 | 5/1919 | United Kingdom | 416/228 |
| 228177 | 7/1925 | United Kingdom | 416/228 |
| 1538055 | 1/1979 | United Kingdom | |
| 2067493 | 7/1981 | United Kingdom | 416/228 |

*Primary Examiner*—John T. Kwon
*Attorney, Agent, or Firm*—Larson & Taylor

[57] ABSTRACT

Flow separation behind the notch region of a swept tip of a helicopter rotor blade is reduced by features of the geometry and aerodynamic characteristics of the notch region itself. In particular it has been found beneficial for a forwardly swept leading edge portion to extend at an angle between 30 degrees and 55 degrees from a reference line parallel to a blade pitch change axis and the leading edge of the aerofoil in the notch region incorporates blade droop.

4 Claims, 4 Drawing Sheets

HELICOPTER ROTOR BLADES

BACKGROUND OF THE INVENTION

1. Field of the Invention

This invention relates to helicopter rotor blades and is particularly concerned with rotor blades of the construction disclosed in GB-A-1538055.

2. Description of the Prior Art

Rotor blades according to GB-A-1538055 are characterised by a swept tip portion which has a forwardly swept leading edge portion, a rearwardly swept leading edge, a rearwardly swept extreme tip edge, and a rearwardly swept trailing edge. The region of the forwardly swept leading edge portion has become known as the notch region and in practice the blended arrangement disclosed in FIG. 3 of GB-A-1538055 has been preferred, the blend comprising blend radii and a central straight joining portion at an angle of about 60 degrees from a line parallel to a blade feathering axis. An inner blend curve blends directly with the blade leading edge and an outer blend curve blends with the rearwardly swept leading edge. Apart from a small residual twist to cater for a change of aerofoil section throughout the notch region on an otherwise nominally about 8 degree linearly twisted blade there is no additional twist in the notch region to tune the aerodynamic characteristics of the notch region.

Such rotor blades have proved highly successful in producing large increases in the allowable rotor operating envelope, and were a significant factor in the establishment of the world absolute speed record for helicopters of 249.10 mph (400.81 km/hr) set by a Westland Lynx helicopter in 1986.

In continuing efforts to improve helicopter performance, wind tunnel tests of the prior rotor blades revealed a tendency for an area of separated flow to occur on an upper surface of the blade behind the notch region. The problem occurs at high angles of incidence in a range typically encountered by the retreating blade of a helicopter sustaining rotor and the size of the separated area increases as incidence is increased.

An objective of this invention is therefore to reduce or eliminate the area of separated flow behind the notch region of a helicopter rotor blade of the construction disclosed in GB-A-1538055.

SUMMARY OF THE INVENTION

Accordingly this invention provides a helicopter rotor blade having a leading edge and a trailing edge defining a blade chord, a pitch change axis and a swept tip of aerofoil section and including a forwardly swept leading edge having a central portion blended respectively with the blade leading edge and a tip rearwardly swept leading edge by inboard and outboard blend curves to define a notch region, wherein said forwardly swept leading edge central portion extends at an angle between 30 degrees and 55 degrees from a reference line parallel to the blade pitch change axis, and the aerofoil section in the notch region includes an inboard notch region leading edge portion incorporating nose droop.

Preferably, the forwardly swept leading edge central portion extends at an angle between 40 degrees and 50 degrees from said reference line.

The notch region leading edge portion may taper smoothly downwardly and inwardly from said inboard blend curve to join blade leading edge at an inboard blade station. The inboard blend curve may blend with said notch region leading edge portion at a blade radius station of about 84 per cent R and said notch region tapered leading edge portion may blend with said blade leading edge at a blade radius station of about 82 per cent R.

BRIEF DESCRIPTION OF THE DRAWINGS

The invention will now be described by way of example only and with reference to the accompanying drawings in which.

DETAILED DESCRIPTION OF THE DRAWINGS

Figure 1:
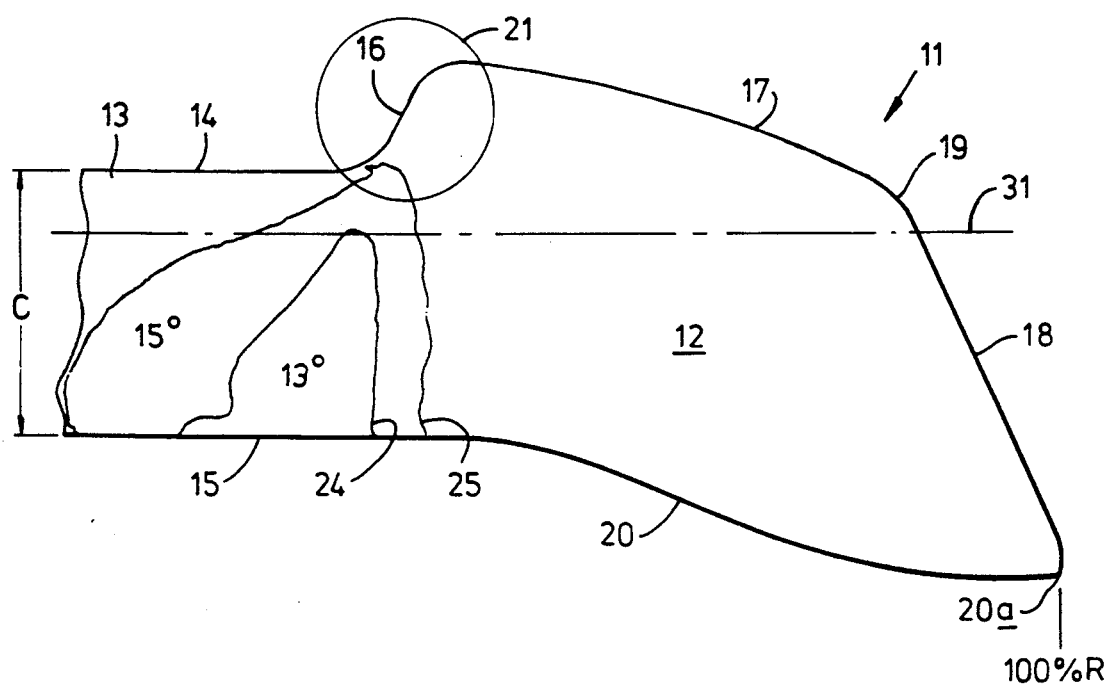
FIG. 1 is a fragmentary plan view of a helicopter rotor blade according to the prior art.

Referring now to FIG. 1, a helicopter sustaining rotor blade generally indicated at 11 of the construction disclosed in GB-A-1538055 includes a swept tip 12 of aerofoil section attached at the end of a central portion 13 of aerofoil section and having a leading edge 14 and a trailing edge 15 defining a blade a chord dimension 'C'. In operation, pitch changes occur about a pitch change ("feathering") axis 31 extending longitudinally along the blade at about 25 per cent chord.

Swept tip 12 includes a forwardly swept leading edge portion 16 blended with the leading edge 14 of the central portion and with a curved rearwardly swept tip leading edge portion 17. A swept extreme tip edge 18 blends with tip leading edge portion 17 in a blend radius portion 19, and a curved rearwardly swept trailing edge 20 blends with trailing edge 15 and extends to join the end of swept tip edge 18 at point 20a to complete the shape of the swept tip 12. Point 20a defines during operation a 100 per cent blade radius station (100% R).

The area of the tip 12 encompassing the forward swept leading edge portion 16 identified within the area 21 on FIG. 1 has become known as the notch region of such rotor blades and will be so referenced in the remainder of this specification.

Wind tunnel tests of the blade of FIG. 1 as a non-rotating wing at a Reynolds Number of $0.6 \times 10^6$ and intended to represent a retreating blade revealed an area of separated flow emanating forward from the trailing edge 15 behind the notch region 21 at high angles of attack or incidence. The area of separated flow first appeared at an incidence of about 9 degrees as a small "kidney" shaped area at the trailing edge 15.

As incidence was increased, the area of separated flow also grew becoming more triangular in shape by spreading inboard along the trailing edge 15 while the apex moves forwardly from the trailing edge 15 along the upper aerofoil surface of the blade. As identified at 24 in FIG. 1, at an angle of incidence of 13 degrees, the generally triangular shaped area of separated flow has a base length of about 0.75 C and has spread forward by a similar amount. At an angle of incidence of 15 degrees the area of separated flow identified at 25 in FIG. 1 actually reaches the leading edge of the blade 11 in the notch region 21 and its base has increased to a length equivalent to about 1.35 C.

The range of incidence angles over which such significant areas of separated flow occur is within a range of angles typically encountered by the retreating blade on a helicopter sustaining rotor, and it was considered that eliminating or reducing the area of separated flow within this range of angles could yield a useful improvement in performance and delay an undesirable increase in flight control loads.

Figure 5:
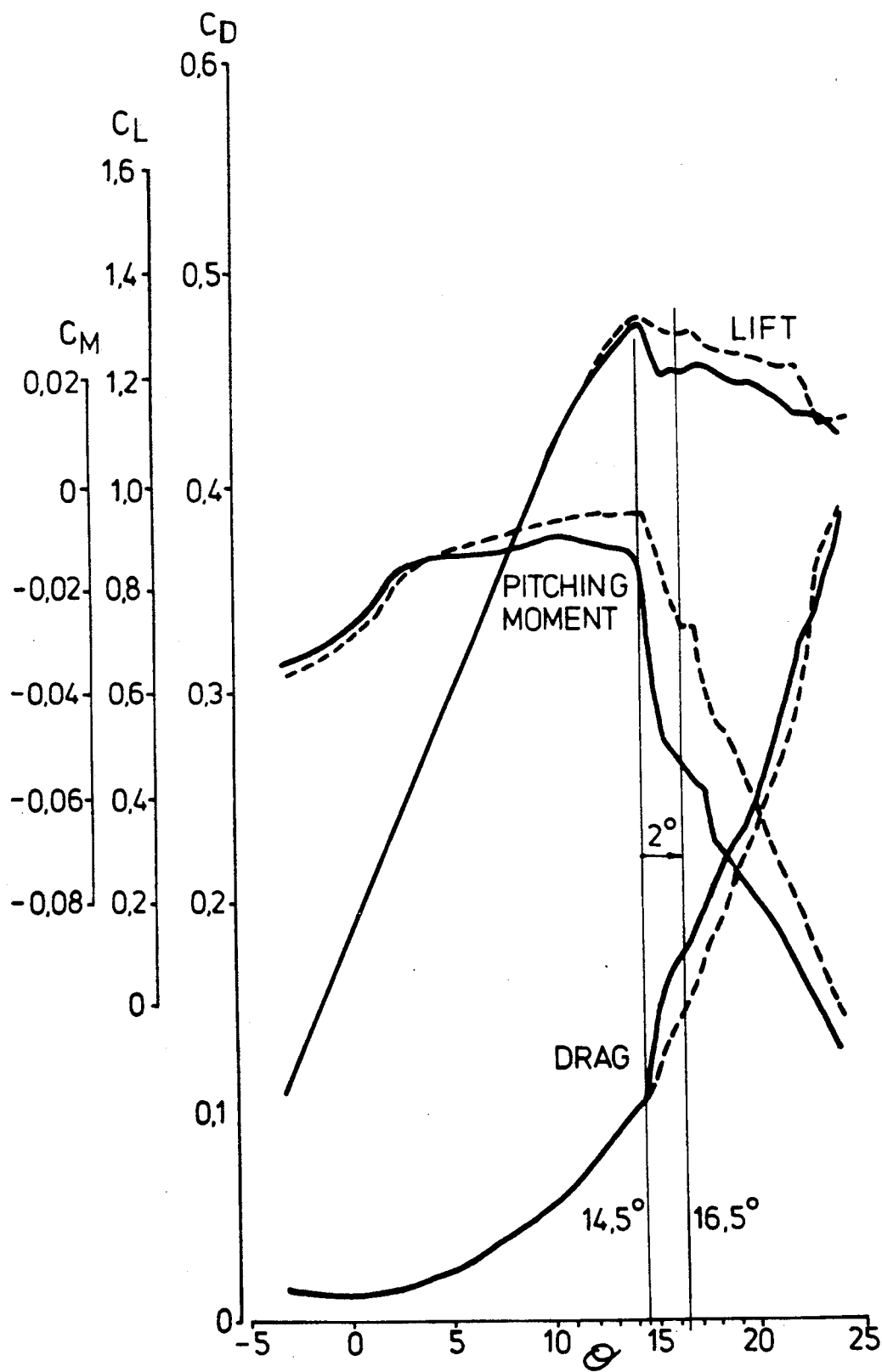
FIG. 5 is a graph plotting rotor blade characteristics against angle of incidence.

The consequences of the onset of separated flow are illustrated in the graph of FIG. 5 which plots drag coefficient ($C_D$), lift coefficient ($C_L$) and pitching moment coefficient ($C_M$) against incidence ($\theta$) and shows characteristics of the prior art rotor blade in full line. Thus, at an incidence angle of about 14.5 degrees as the area of separated flow approaches the leading edge of the aerofoil (FIG. 1), the prior art rotor blade exhibits a sharp break in lift and pitching moment, and a sharp increase in drag, all clearly representative of a stall condition.

This undesirable separation of airflow and its increasing area with incidence was thought to be due to large adverse pressure gradients just behind the aerofoil leading edge in the notch region, and the inventor considered various changes to the geometry of the notch region to overcome the problem.

Figure 2:
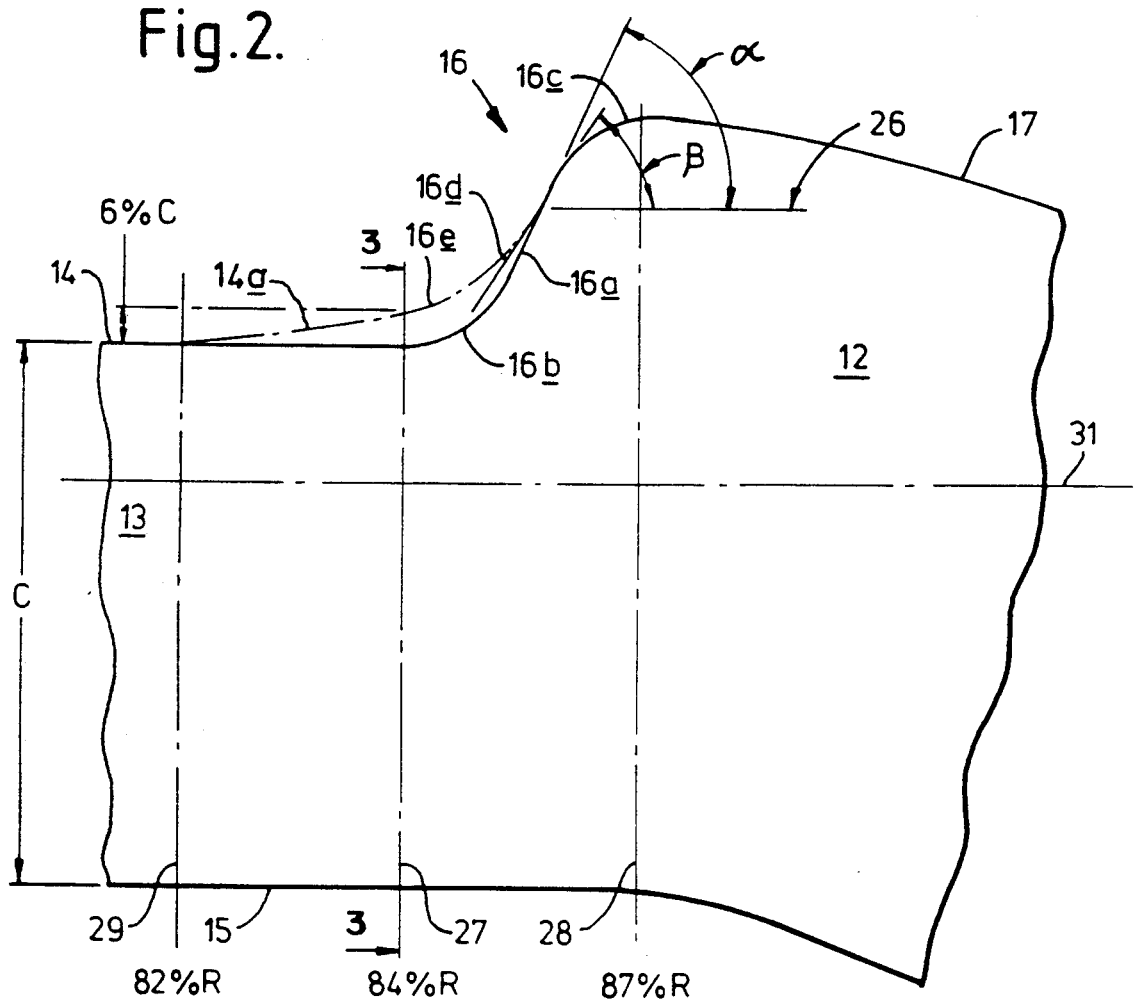
FIG. 2 is a fragmentary plan view of a helicopter rotor blade comparing features of the blade of the invention with the prior art blade.
Figure 3:
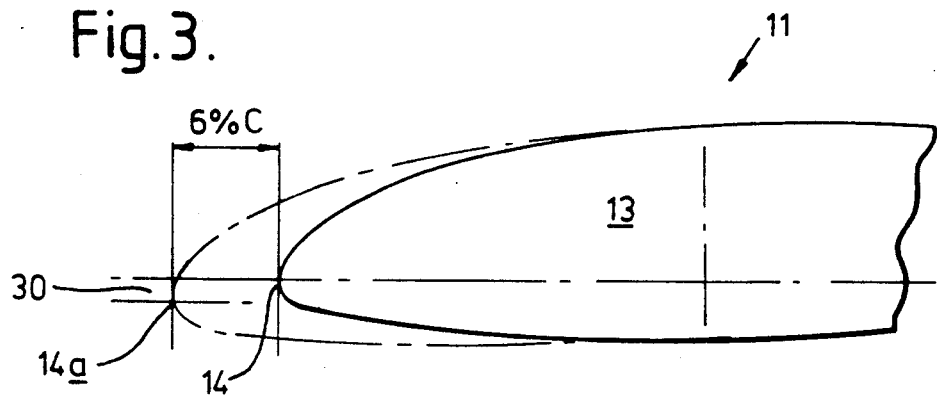
FIG. 3 is a fragmentary sectioned view taken along lines 3—3 of FIG. 2.

FIGS. 2 and 3 compare the geometry of the notch region 21 of the prior art rotor blade (shown in full line) with that of the notch region 21 of a rotor blade according to this invention (shown in dotted line).

Thus, the forwardly extending leading edge portion 16 of the prior art rotor blade includes a short central straight portion 16a which on the blade tested extends at an angle $\alpha$ of 64.4 degrees from a reference line 26 parallel to feathering axis 31. Portion 16a is blended by an inboard blend curve 16b with the leading edge 14 commencing from a blade radius station 27 of about 84% R, and an outboard blend curve 16c with swept leading edge portion 17 at a blade radius station 28 of about 87% R.

The aerofoil section changes from RAE 9645 at station 84% R to RAE 9634 at station 87% R. Apart from a small residual value of twist of about 0.3 degrees to cater for the change of aerofoil on an otherwise nominally 8.32 degree linearly twisted blade there is no additional twist in the notch region 21 to tune the aerodynamic characteristics of the notch.

The rotor blade of this invention is characterised by a modified notch configuration which in the embodiment of FIGS. 2 and 3 incorporates a forwardly swept leading edge 16 including a central straight portion 16d extending at an angle $\beta$ of 50 degrees from the reference line 26. The portion 16d is blended by outboard blend curve 16c with swept tip leading edge portion 17 at blade radius station 28 (87% R) similar to the prior art blade. In the blade of the invention, the blade chord is increased forwardly of leading edge 14 at blade station 27 (84% R) by an amount equivalent to about 6% C so that the forwardly swept leading edge 16 includes a notch region leading edge portion 14a which is blended smoothly with central straight portion 16d by inner blend curve 16e. Inboard of station 27 (84% R), the notch region leading edge portion 14a tapers smoothly downwardly and inwardly to rejoin blade leading edge 14 at an inboard blade radius station 29 at about 82% R.

The modified notch region 21 of this invention incorporates additional camber primarily concentrated at but not necessarily limited to the inboard area in the notch region leading edge portion 14a and which is blended back to camber lines of the aerofoil sections inboard and outboard of the notch. The modified notch region 21 incorporates nose down twist again primarily concentrated in the inboard area in the notch region leading edge portion 14a and which is distributed and blended back to the nominal twist of the blade. The introduction of increased camber and nose down twist gives the notch region 21 a nose down droop in notch region leading edge portion 14a of about 1 per cent as shown at 30 in FIG. 3, which also shows an increased leading edge radius which is concentrated at the inboard area of the notch and blended back to the nominal aerofoil sections inboard and outboard of that area.

Figure 4:
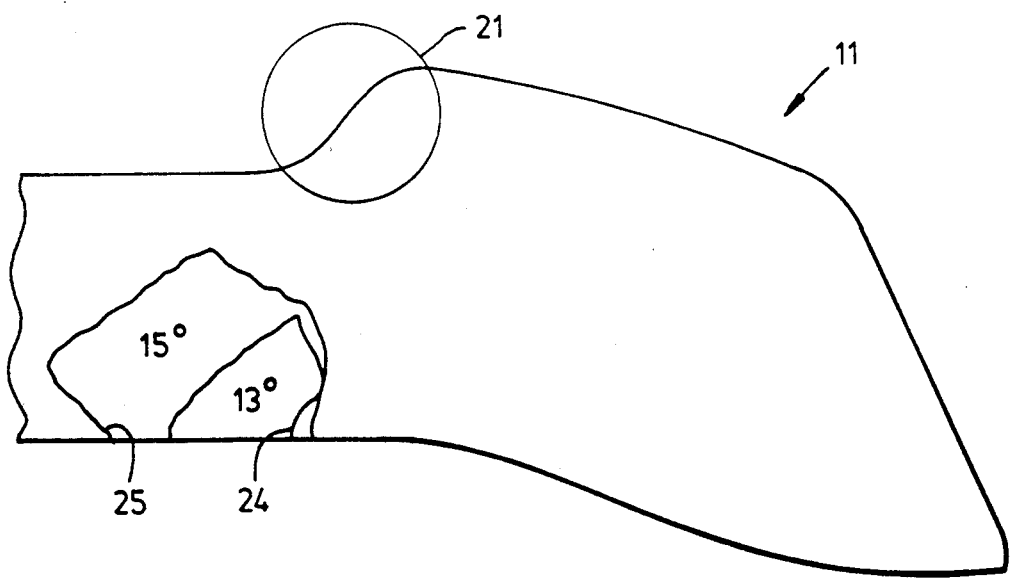
FIG. 4 is a fragmentary plan view of part of the rotor blade of this invention.

Wind tunnel testing of the non-rotating rotor blade of FIGS. 2 and 3 showed that the new notch configuration was extremely effective in suppressing the spread of flow separation and delaying stalling of the rotor blade. This is shown in FIG. 4 which illustrates a rotor blade 11 with a notch region 21 according to this invention, and shows that the areas of separated flow at angles of incidence of both 13 degrees identified at 24 and 15 degrees identified at 25 are significantly reduced compared to those of the prior art rotor blade of FIG. 1.

These benefits result from the subtle changes to the aerodynamic profile introduced into the notch region 21 by the invention which provide enhanced control of the adverse pressure gradients and hence boundary layer behaviour in the notch region 21.

The result of the considerable reduction in the area of flow separation at high incidence is shown in FIG. 5 in which the characteristics of the rotor blade of the invention are shown in dotted lines. Thus the break in the lift curve is significantly delayed above an angle of incidence for maximum lift and the post stall lift characteristics are much improved. The break in the drag curve is delayed and a more gradual divergence of the pitching moment and drag characteristics is evident.

The delay in drag divergence provides a reduction in the power required by the rotor blade of this invention and the delay in pitching moment break will delay control load growth in forward flight at the retreating blade limits. Performance also is enhanced at high incidence by the delay in the loss of lift.

Figure 6:
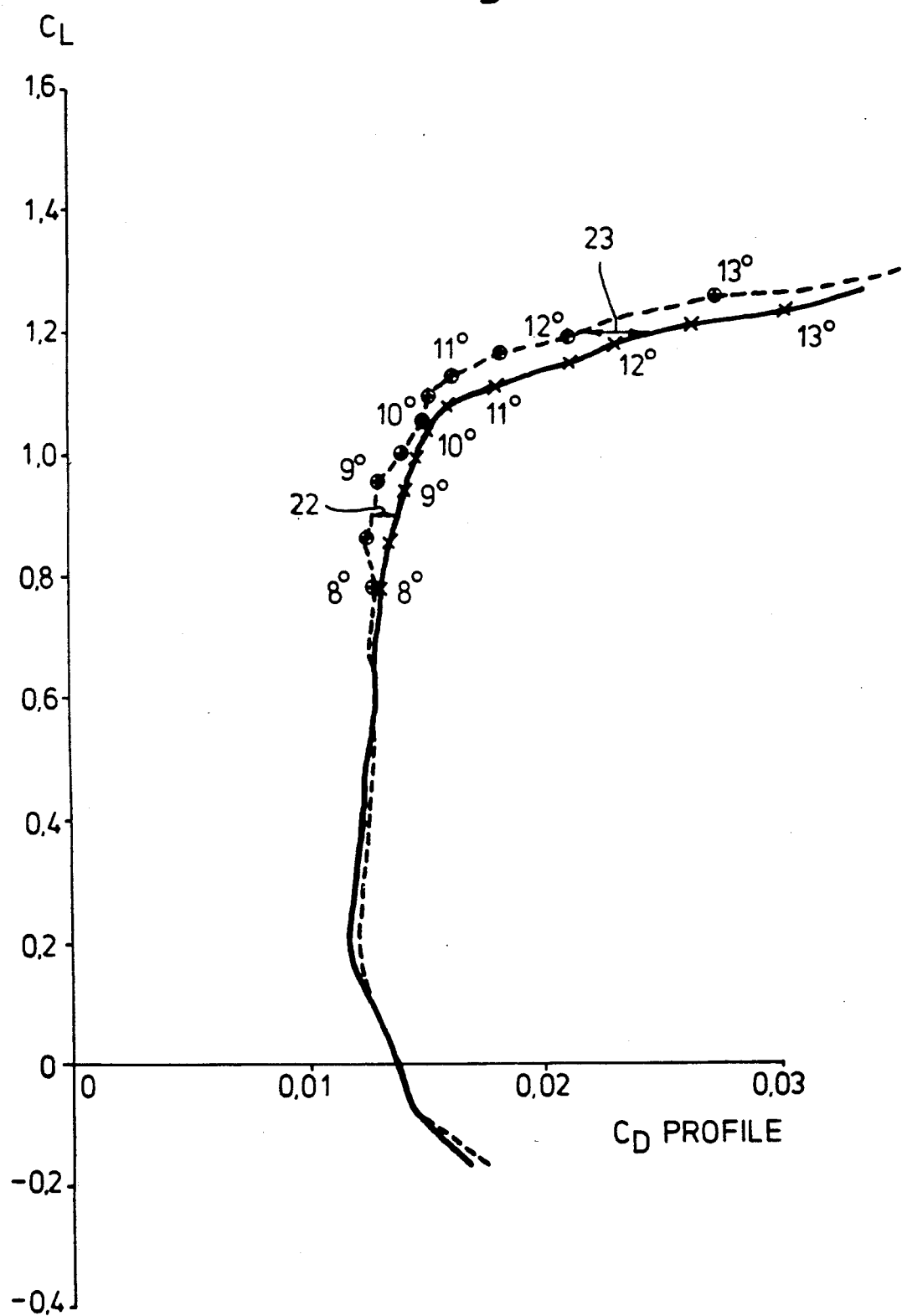
FIG. 6 is a graph plotting rotor blade lift against profile drag.

FIG. 6 plots lift coefficient ($C_L$) against profile drag coefficient ($C_D$) to illustrate more clearly the characteristics of the blade of the invention at lower angles of incidence. As before, the characteristics of the blade of the invention are shown in dotted line. It will be noted that at low lift coefficients below about 0.75 the modified notch 21 of this invention has little or no effect on the profile drag. However, at a moderate lift coefficient of about 0.9 there is a useful reduction in profile drag as indicated at 22. As shown this is representative of an angle of incidence between eight and nine degrees. At high lift represented say by a lift coefficient of 1.2 the reduction in profile drag has increased to that indicated at 23 in FIG. 6, and is representative of an angle of incidence of about twelve degrees.

FIG. 6 confirms that the area of flow separation is completely eliminated at angles of incidence lower than those for which the data of FIGS. 1 and 4 were obtained.

Whilst one embodiment has been described and illustrated it will be apparent that many modifications may be made without departing from the scope of the invention as defined in the appended claims. For example, the angle of the forwardly swept leading edge portion 16d can be other than 50 degrees although it is expected that it will lie within the range of 30 to 55 degrees and preferably within the range 40 to 50 degrees.

What is claimed is:

1. A helicopter rotor blade having a leading edge and a trailing edge defining a blade chord, a pitch change axis and a swept tip of aerofoil section and having a forwardly swept leading edge including a central portion blended respectively with the blade leading edge and a tip rearwardly swept leading edge by inboard and outboard blend curves to define a notch region wherein said forwardly swept leading edge central portion extends at an angle between 30 degrees and 55 degrees from a reference line parallel to the blade pitch change axis and the leading edge of the aerofoil section in the notch region incorporates blade droop.

2. A rotor blade as claimed in claim 1, wherein said forwardly swept leading edge central portion extends at an angle between 40 degrees and 50 degrees.

3. A rotor blade as claimed in claim 1 wherein said forwardly swept leading edge includes a notch region leading edge portion which tapers smoothly downwardly and inwardly from said inboard blend curve to join the blade leading edge at an inboard blade station.

4. A rotor blade as claimed in claim 3, wherein said inboard blend curve blends with said tapered notch region leading edge portion at a blade radius station of about 84 per cent R and said tapered notch region leading edge portion blends with said blade leading edge at a blade radius station of about 82 per cent R.

* * * * *